United States Patent Office 2,889,720
Patented June 9, 1959

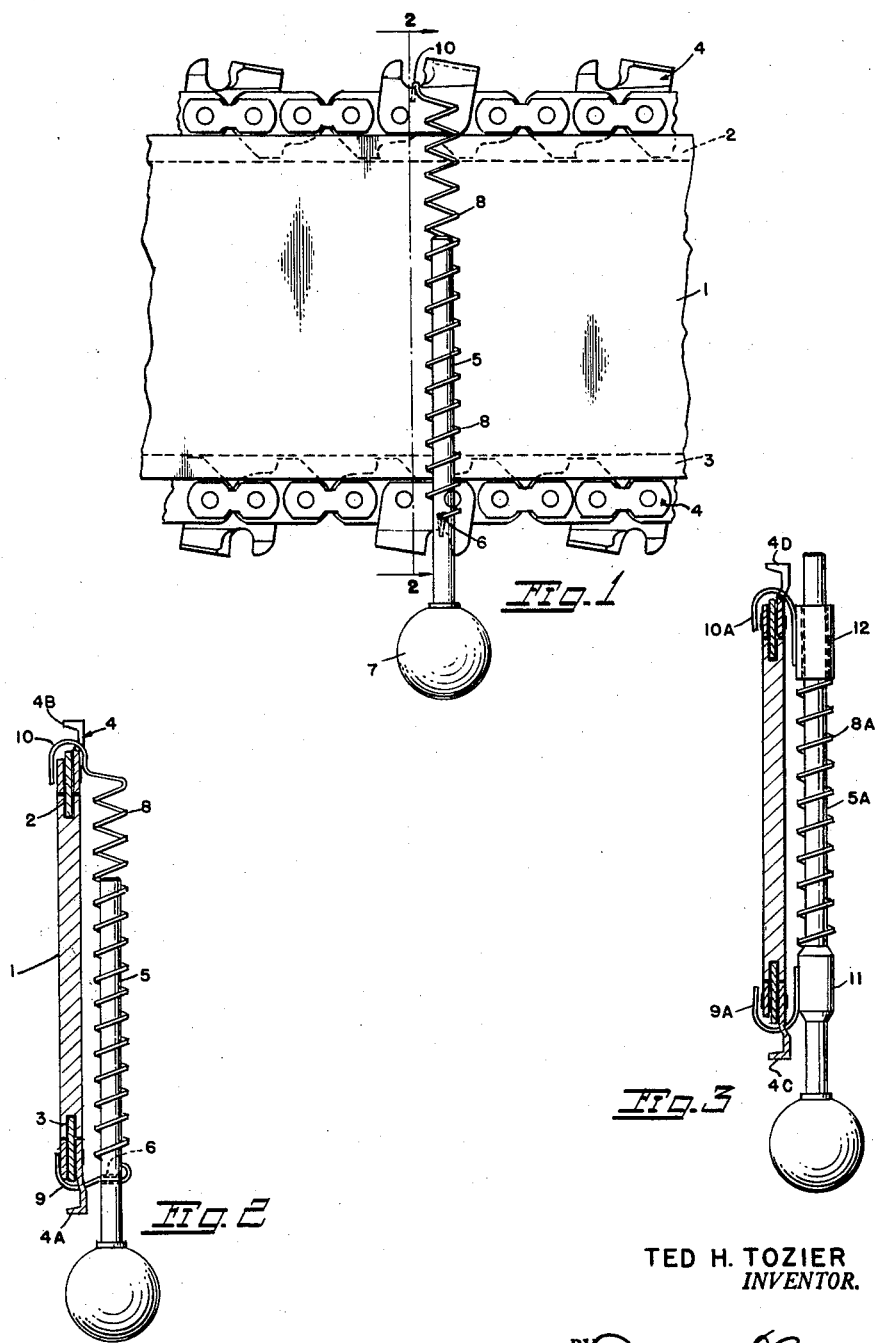

2,889,720
STABILIZING DEVICE FOR SAW CHAINS
Ted H. Tozier, Sutherlin, Oreg.
Application July 22, 1957, Serial No. 673,484
3 Claims. (Cl. 76—78)

This invention relates generally to chain saws and more particularly to a device constructed to facilitate sharpening the saw teeth of portable and semi-portable chain saws.

The principal object of the invention is to provide a device of this character which is of simple, efficient, durable, compact, pocket size construction and thereby adapted to be carried by a woodsman along with whatever type of saw filing device he includes in his equipment, thus enabling him to sharpen the saw teeth at the logging operation instead of taking the saw to some distant shop or other facility for precision sharpening.

Another object is the provision of a device of this character so constructed that it may be quickly and conveniently attached to the top and bottom runs of all types of saw chains, including rounded, chisel, hooded chisel, rivet pitch, and others for securely clamping the teeth within their chain groove about the perimeter of the saw bar against reciprocating forces of the tooth-filing operations.

The foregoing and other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a fragmentary elevational view of a saw bar and chain saw showing my invention in operative engagement therewith.

Figure 2 is a sectional end view taken along the line 2—2 of Figure 1.

Figure 3 is a view similar to Figure 2 showing a modified form of the invention.

With continuing reference to the drawing and particularly Figures 1 and 2 thereof:

Reference numeral 1 indicates a conventional saw bar having grooves 2 and 3 in its top and bottom edges and in which an endless chain saw 4 travels about the perimeter of the saw bar. The main body of the invention comprises a rod 5 having an aperture 6 therethrough near its bottom end and a handgrip 7 secured to its bottom end. One end of a tension spring 8 passes through the opening 6 in the rod for permanent attachment thereto. As best shown in Figure 2, this end of the compression spring extends outwardly from the rod and terminates in a hook portion 9 for engagement with the bottom run 4A of the saw teeth and the opposite end of the spring is provided with a companion hook member 10 for engagement with the top run 4B of the chain saw.

In the modified form of the invention shown in Figure 3 I enlarge the rod 5A near its bottom end as at 11 and to this enlargement I secure the bottom end of the tension spring 8A whose opposite end is secured to the bottom end of a sleeve 12 slidable along the rod 5A. The enlargement 11 is provided with an upwardly opening hook 9A engageable with the teeth 4C of the bottom run of the chain saw and cooperating with a downwardly opening hook 10A engageable with the teeth 4D of the top run thereof.

From the foregoing it will be apparent that either form of the invention is capable of clamping both runs of a saw chain within their respective grooves about the perimeter of the saw bar against reciprocating forces of saw filing operations.

While I have shown particular forms of embodiment of my invention I am aware that many minor changes therein will readily suggest themselves to others skilled in the art without departing from the spirit and scope of the invention. Having thus described my invention what I claim as new and desire to protect by Letters Patent is:

I claim:

1. A device for stabilizing a chain saw in a groove about the perimeter of a saw bar during filing operations of the teeth of the chain saw, said device comprising in combination a single pull-rod having a top and bottom end and terminating at its bottom end in a handgrip, a tension spring surrounding the pull-rod, an upwardly opening hook provided at the bottom end of said spring above the handgrip and adapted for engagement with the bottom run of a chain saw within a groove about the perimeter of a saw bar, the top end of said spring being provided with a downwardly opening hook portion adapted for engagement with the top run of a chain saw within said groove whereby upon engagement of both of said hook portions with their respective runs of the chain saw the chain will be securely held in compression within said chain groove against reciprocating forces of filing operations.

2. A device for stabilizing a chain saw in a groove about the perimeter of a saw bar during filing operations of the teeth of the chain saw, said device comprising in combination a single pull-rod having a top and bottom end and terminating at its bottom end in a handgrip, said rod having an opening therethrough near its bottom end above said handgrip, a tension spring surrounding the pull-rod and having one of its ends extending through said opening and terminating in an upwardly opening hook portion adapted for engagement with the bottom run of a chain saw within said groove, the opposite end of said spring terminating in a downwardly opening hook portion adapted for engagement with the top run of a chain saw within said groove whereby upon engagement of both of said hook portions with their respective runs of the chain saw the chain will be securely held within said chain groove against reciprocating forces of filing operations.

3. A device for stabilizing a chain saw in a groove about the perimeter of a saw bar during filing operations of the teeth of the chain saw, said device comprising a single pull-rod enlarged in diameter near one of its ends and terminating in a handgrip at said one end, a tension spring surrounding said rod and having one of its ends secured to said enlargement and its opposite end secured to a sleeve slidably mounted on the rod and spaced from said enlargement, an upwardly opening hook member and a downwardly opening hook member secured respectively to said enlargement and to said sleeve and adapted for respective engagement with the bottom and top runs of a chain saw within said groove in the perimeter of a saw bar whereby to securely hold the chain saw in the groove against reciprocating forces of filing operations.

References Cited in the file of this patent
UNITED STATES PATENTS

| | | |
|---|---|---|
| 202,704 | Clark et al. | Apr. 23, 1878 |
| 236,581 | Haworth et al. | Jan. 11, 1881 |
| 371,920 | Both | Oct. 25, 1887 |
| 543,903 | Seibert | Aug. 6, 1895 |
| 554,969 | Austin | Feb. 18, 1896 |
| 923,953 | Davis | June 8, 1909 |
| 1,336,383 | Shimizu | Apr. 6, 1920 |
| 1,846,583 | Chase | Feb. 23, 1932 |
| 1,987,943 | Munson | Jan. 15, 1935 |
| 2,286,254 | Brault | June 16, 1942 |
| 2,497,760 | Chambers | Feb. 14, 1950 |
| 2,508,076 | Palmer | May 16, 1950 |